(12) United States Patent
Brady et al.

(10) Patent No.: US 11,774,295 B2
(45) Date of Patent: Oct. 3, 2023

(54) COGNITIVE ENERGY ASSESSMENT BY A NON-INTRUSIVE SENSOR IN A THERMAL ENERGY FLUID TRANSFER SYSTEM

(71) Applicant: INTERNATIONAL BUSINESS MACHINES CORPORATION, Armonk, NY (US)

(72) Inventors: Niall Brady, Donadea (IE); Paulito Palmes, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 945 days.

(21) Appl. No.: 15/689,639

(22) Filed: Aug. 29, 2017

(65) Prior Publication Data

US 2019/0064004 A1 Feb. 28, 2019

(51) Int. Cl.
*G01K 7/01* (2006.01)
*G06F 3/048* (2013.01)
*G01K 17/20* (2006.01)
*G01K 1/022* (2021.01)
*G01K 1/02* (2021.01)
(Continued)

(52) U.S. Cl.
CPC .............. *G01K 7/01* (2013.01); *G01K 17/20* (2013.01); *G06F 3/048* (2013.01); *F22B 37/02* (2013.01); *G01K 1/022* (2013.01); *G01K 1/026* (2013.01); *G01K 2213/00* (2013.01); *G06N 20/00* (2019.01)

(58) Field of Classification Search
CPC .......... G01K 7/01; G01K 17/20; G01K 1/026; G06N 20/00; F22B 37/02
See application file for complete search history.

(56) References Cited

U.S. PATENT DOCUMENTS 8,407,015 B2    3/2013   Yatir et al.
10,845,226 B2 * 11/2020   Han ..................... G01F 1/688
(Continued)

FOREIGN PATENT DOCUMENTS

CN    103765468 A    4/2014
CN    104061664 A    9/2014
(Continued)

OTHER PUBLICATIONS

"Transforming Industrial Devices into Smart, Cloud-Connected Devices," Sierra Monitor Corporation, Apr. 2016 (13 pages).

*Primary Examiner* — Alexey Shmatov
*Assistant Examiner* — Beatriz Ramirez Bravo
(74) *Attorney, Agent, or Firm* — Griffiths & Seaton PLLC

(57) ABSTRACT

Embodiments for assessing energy in a thermal energy fluid transfer system in a cloud computing environment by a processor. Behavior of the thermal energy fluid transfer system, associated with a heating service, a cooling service, or a combination thereof, may be learned according to collected data to identify one or more energy usage events. An energy usage assessment operation may be performed using temperature signal disambiguation operations, with data collected over a selected time period by one or more non-intrusive Internet of Things (IoT) sensors located at one or more selected positions in the thermal energy fluid transfer system, to learn the system performance indicators, and when coupled with ingested expected policy behavior, identify one or more energy usage waste events according to the learned behavior in real time.

20 Claims, 12 Drawing Sheets

(51) Int. Cl.
*G06N 20/00* (2019.01)
*F22B 37/02* (2006.01)

(56) References Cited

U.S. PATENT DOCUMENTS

| | | |
|---|---|---|
| 2010/0262403 A1 | 10/2010 | Gordon et al. |
| 2010/0307171 A1* | 12/2010 | Hamann ............ H05K 7/20745 |
| | | 62/77 |
| 2016/0010878 A1* | 1/2016 | Lee .................... F24D 19/1063 |
| | | 700/300 |
| 2016/0116512 A1 | 4/2016 | Young et al. |
| 2016/0187004 A1* | 6/2016 | Wheelwright ........ F24H 9/2007 |
| | | 236/51 |
| 2016/0266594 A1* | 9/2016 | Kauffman ............... G06Q 50/06 |
| 2016/0330285 A1 | 11/2016 | Brophy et al. |
| 2018/0292098 A1* | 10/2018 | Bandyopadhyay ...... F24F 11/30 |
| 2019/0107293 A1* | 4/2019 | Braier ................. F24D 19/1072 |
| 2019/0170396 A1* | 6/2019 | Azulay .................. F24H 1/225 |

FOREIGN PATENT DOCUMENTS

| | | | | |
|---|---|---|---|---|
| CN | 105143830 A | | 12/2015 | |
| CN | 106537429 A | | 3/2017 | |
| EP | 3291030 A1 | * | 3/2018 | ............. G05B 15/02 |
| GB | 2519986 A1 | | 5/2015 | |
| JP | 2005009701 A | | 1/2005 | |
| JP | 2005301582 A | | 10/2005 | |
| JP | 2016526149 A | | 9/2016 | |
| JP | 2016526149 A | * | 9/2016 | |
| JP | 2017067375 A | | 4/2017 | |
| JP | 2017535006 A | | 11/2017 | |
| KR | 20170073175 A | * | 6/2017 | |
| WO | 2015184123 A1 | | 12/2015 | |
| WO | 2017022312 A1 | | 2/2017 | |

* cited by examiner

Example of Daily (4am to 9pm) Building Boiler Treturn Signal Profile Defining Different Significant Energy Events (including no load event detection from 11am)

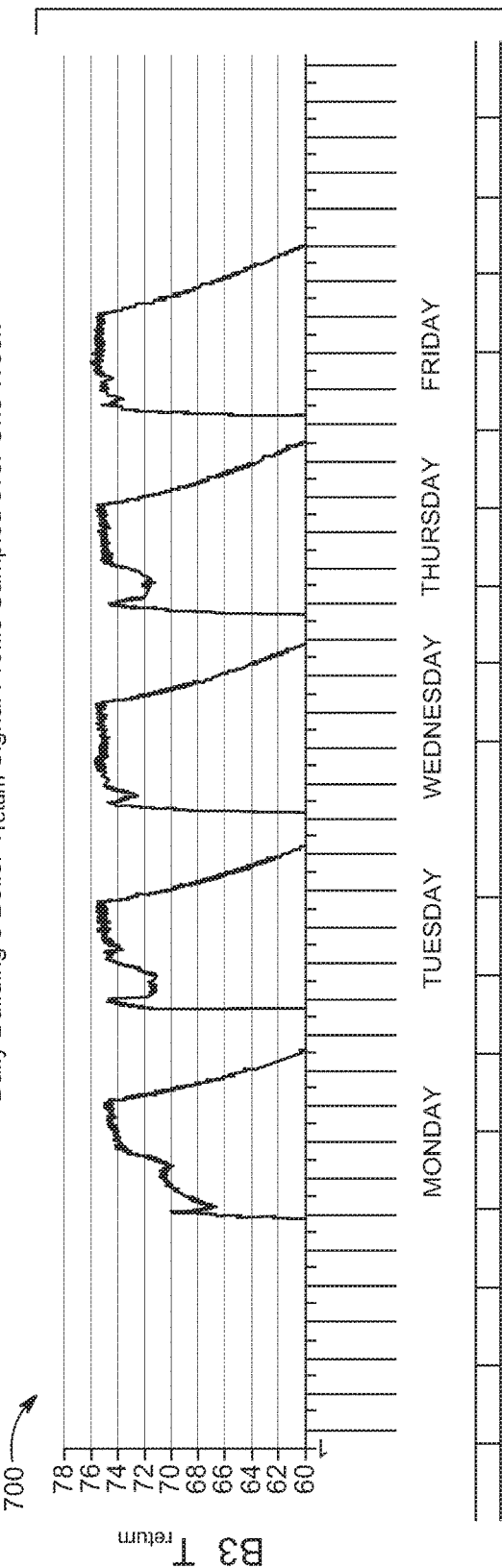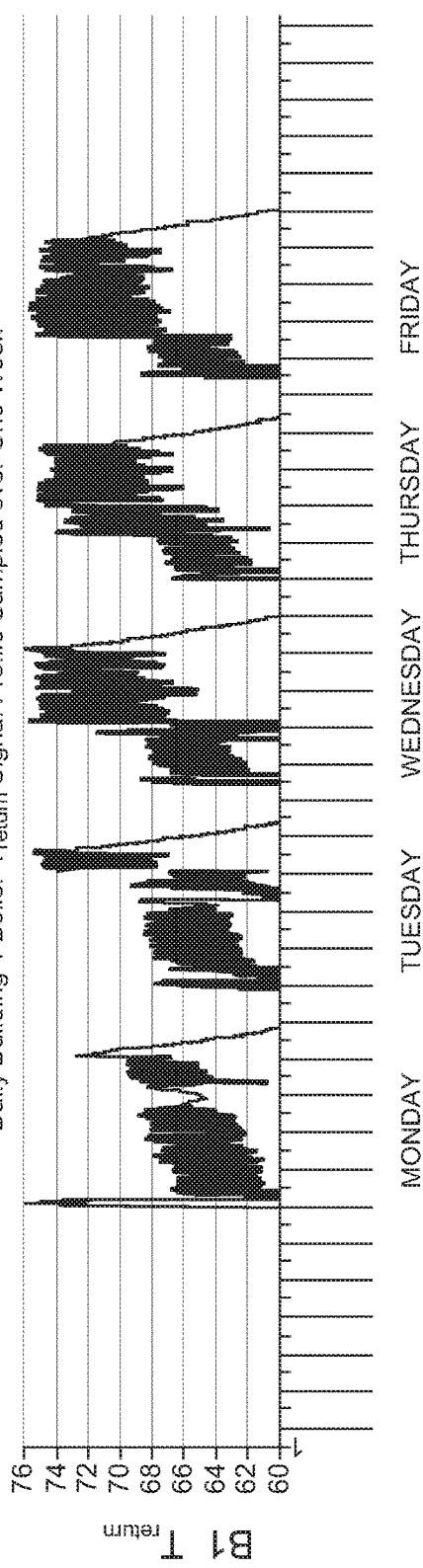
FIG. 7

| | 12 | 13 | 14 | 15 | 16 | 17 | 18 | 19 | 20 |
|---|---|---|---|---|---|---|---|---|---|
| SYS_OUTOFHOURS_EVENTS | 0 | 0 | 0 | 0 | 0 | 0 | 0 | 0 | 0 |
| SYS_NOLOAD_START | NA | 16:30 | 16:49 | 18:22 | 16:39 | 14:27 | NA | NA | 18:16 |
| SYS_HIDEMAND_EVENTS | 0 | 37 | 33 | 8 | 19 | 6 | 0 | 0 | 17 |
| SYSRUNUP_TIME | 1 | 46 | 28 | 29 | 29 | 30 | 1 | 1 | 55 |
| SYSDISABLE_TIME | NA | 19:26 | 18:32 | 18:37 | 19:14 | 18:06 | NA | NA | 19:21 |
| SYSENABLE_TIME | NA | 00:59 | 04:58 | 04:57 | 04:57 | 02:55 | NA | NA | 00:57 |
| BOILERDAILY_STARTS | 0 | 59 | 52 | 48 | 52 | 41 | 0 | 0 | 50 |
| SYS_CUTOFF_TEMP | 0 | 67.59 | 69.9 | 70.63 | 70.69 | 73.08 | 0 | 0 | 72.94 |
| MISSING_VAL | 25.90% | 27.43% | 28.06% | 26.39% | 28.13% | 27.71% | 25.76% | 29.17% | 29.88% |
| NO_OFVALS | 1440 | 1440 | 1440 | 1440 | 1440 | 1440 | 1440 | 1440 | 1439 |
| WDAY | SUN | MON | TUE | WED | THURS | FRI | SAT | SUN | MON |
| MONTH | FEB | FEB | FEB | FEB | FEB | FEB | FEB | FEB | FEB |
| DAY | 12 | 13 | 14 | 15 | 16 | 17 | 18 | 19 | 20 |

FLAG* FRIDAY 17TH: EARLY NO LOAD DETECTION: OUTSIDE EXPECTED NORMS FOR TIME OF YEAR

DAILY REPORTING FOR BOILER SCHEDULING ANOMALIES FLAG FRIDAY 17TH: EARLY START OUTSIDE POLICY

FIG. 11

COGNITIVE ENERGY ASSESSMENT BY A NON-INTRUSIVE SENSOR IN A THERMAL ENERGY FLUID TRANSFER SYSTEM

BACKGROUND OF THE INVENTION

Field of the Invention

The present invention relates in general to computing systems, and more particularly to, various embodiments for cognitive energy assessments in a thermal energy fluid transfer system in a cloud computing environment using a computing processor.

Description of the Related Art

In today's society, various advances in mechanical systems, coupled with advances in computing technology have made possible a wide variety of attendant benefits, such as increasing the efficiency of thermal energy fluid transfer systems. As computers proliferate throughout aspects of society, additional opportunities continue to present themselves for leveraging technology in thermal energy fluid transfer systems for improving efficiency of power and energy consumption while minimizing energy footprints.

SUMMARY OF THE INVENTION

Various embodiments are provided for cognitive energy assessments in a thermal energy fluid transfer system in a cloud computing environment by one or more processors associated with one or more memory. In one embodiment, by way of example only, a method/system for cognitive energy assessments in a thermal energy fluid transfer system using an array of Internet of Things (IoT) sensors in a cloud computing environment is provided. Embodiments for cognitive energy assessments in a thermal energy fluid transfer system may be in a cloud computing environment. Behavior of the thermal energy fluid transfer system, associated with a heating service, a cooling service, or a combination thereof, may be learned according to collected disambiguated control signal data to identify one or more energy usage events. An energy usage assessment operation may be performed using temperature signal disambiguation operations, with data collected over a selected time period by one or more non-intrusive Internet of Things (IoT) sensors located at one or more selected positions in the thermal energy fluid transfer system, to learn the system performance indicators, and when coupled with ingested expected policy behavior, identify one or more energy usage waste events according to the learned behavior in real time.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a graph diagram of output results of comparing temperature signals for a selected time period during a supervised learning phase in a thermal energy fluid transfer system in accordance with aspects of the present invention;

FIG. 11 is a diagram depicting an output report of cognitive energy assessment of a thermal energy fluid transfer system in an Internet of Things (IoT) computing network in accordance with aspects of the present invention.

DETAILED DESCRIPTION OF THE DRAWINGS

Figure 1:
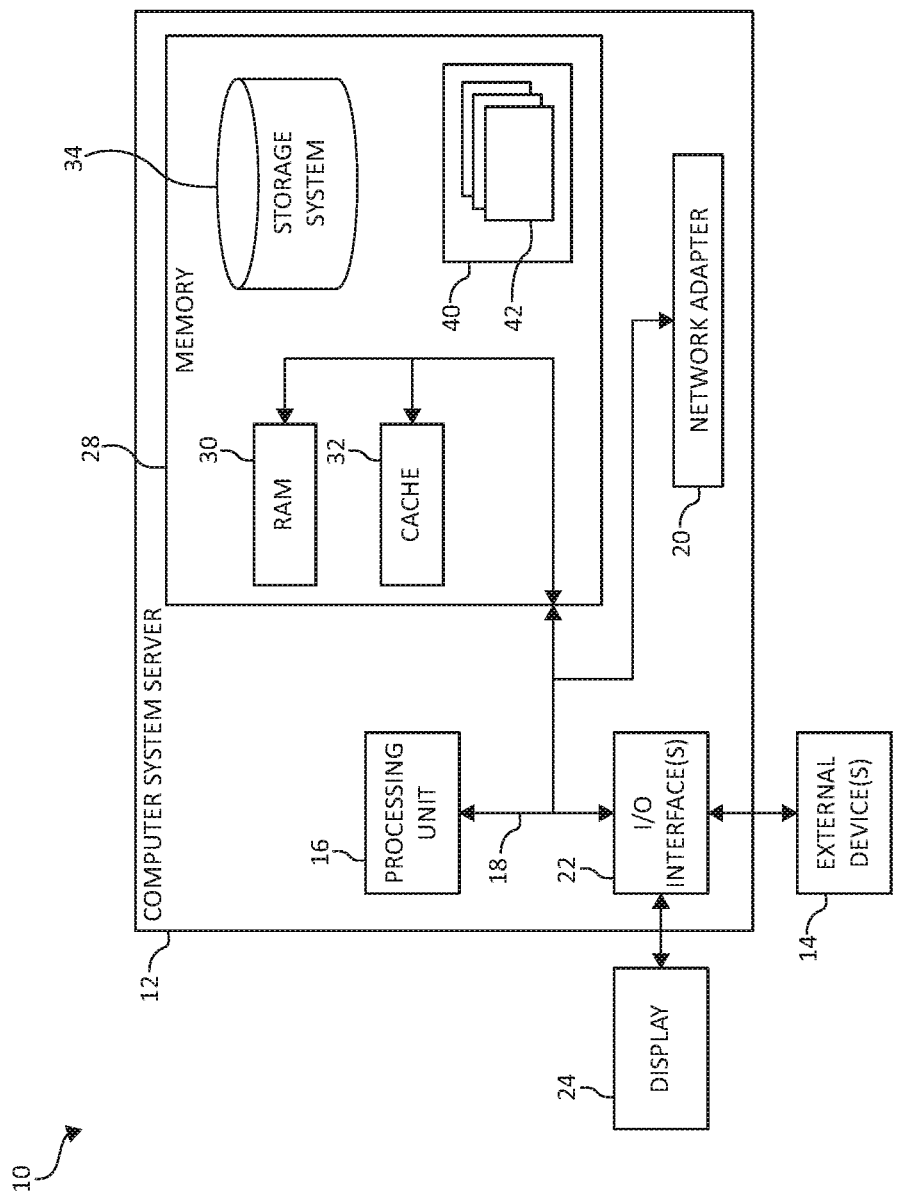
FIG. 1 is a block diagram depicting an exemplary computing node according to an embodiment of the present invention.

As will be described herein, various embodiments provided herein pertain to thermal energy fluid transfer systems such as, for example, thermal energy pumped liquid delivery systems, systems that may include high pressure hot water ("HPHW" or steam) systems, low pressure hot water (LPHW) systems, process cooling water, chilled water, refrigeration (high pressure side) systems, or other fluid pump systems.

Many of these thermal energy fluid transfer systems are used within various types of buildings such as, for example, commercial buildings. Also, a vast majority of these building may use natural gas in boiler systems, which requires a substantial amount of energy consumption particularly as the boiler systems relate to hot water services. Yet, in many of building environments, operating sizable boiler estates and provisioning of LPHW services (e.g., various levels of awareness of boiler operations and performance) are less understood as compared to electricity-based energy user counterparts. This is primarily due to high reliability levels associated with gas boiler operations, where boiler rooms tend to be managed as a "black box" and inspecting boiler rooms tend to be limited or only in response to boiler trip alarms. Given the complexity and difficulty in accessing these thermal energy fluid transfer systems, it is difficult to gain access to underlying control data since the thermal energy fluid transfer systems are standalone and may be proprietary systems. As such, there is a need to provide continuous and cognitive energy performance assessments for identifying one or more energy saving opportunities.

Accordingly, various embodiments are provided herein for cognitive energy assessments in a thermal energy fluid transfer system in a cloud computing environment. In one embodiment, by way of example only, a method/system for cognitive energy assessments in a thermal energy fluid transfer system using an array of Internet of Things (IoT) sensors in a cloud computing environment is provided. Embodiments for cognitive energy assessments in a thermal energy fluid transfer system may be in a cloud computing environment. Behavior of the thermal energy fluid transfer system (which may be a heating service, a cooling service, or a combination thereof) may be learned according to collected data to identify one or more energy usage events. An energy usage assessment operation may be performed using a temperature signal collected over a selected time period by one or more non-intrusive Internet of Things (IoT) sensors located at one or more selected positions in the thermal energy fluid transfer system to identify one or more energy usage waste events according to the learned behavior. The cognitive energy assessments in a thermal energy fluid transfer system provide the ability to conduct necessary energy waste assessments to identify one or more energy waste events. Temperature signal data may be used to detect and report the energy waste events.

In one aspect, embodiments described herein provide for the disambiguation of a single, time series temperature signal, which may be of a common return temperature in a return line of the thermal energy fluid transfer system. An IoT sensor device may detect the return line temperature to enable cognitive energy assessment of the thermal energy fluid transfer system. Initially, the thermal energy fluid transfer system's behavior may be learned. Energy usage events may be disseminated in the temperature signal, and subsequently used to detect energy wastage events. The energy wastage events may include, for example, schedule mismatches, system no load or onset of dry cycling events that can influence schedule change points (e.g., onset of summer and winter boiler operations which allows for large energy saving opportunities to be realized), or other defined energy wastage events.

In this way, the proposed invention provides analytical assessment of energy usage and energy waste usage on demand and in real time. In this way, the present invention overcomes any requirement of deployment of intrusive specialist hardware equipment, prolonged system shutdowns, or using domain expertise to interpret the output, which is both costly given its specialist nature and given the levels of effort and time involved. The proposed invention eliminates any requirement for direct boiler control interrogation or building management system ("BMS") access to conduct the cognitive energy assessment of the boiler while eliminating a need for specialist hardware installation. In one aspect, a wireless strap on IoT enabled temperature sensor can be applied to the return temperature loop of a pipe network in the thermal energy fluid transfer system which requires no system intervention, setup, installation or wiring.

In one aspect, the present invention pertains to any closed-loop thermal energy fluid transfer system (heating and cooling). The benefits and advantages of the system may include eliminating/reducing the requirement to shut down a system. In one aspect, the present invention provides for one or more non-intrusive IoT sensors deployable in a thermal energy fluid transfer system (including heating and cooling systems) without installation resource support that may operate within a cloud computing environment. The one or more non-intrusive IoT sensors may be selectively and/or strategically positioned on one or more pipes such as, for example, a return line of the pipe network (e.g., connect/strap on to outside of a pipe in a return line in a network of piping) in any closed pumped thermal energy fluid transfer system (which may include high pressure hot water ("HPHW" or steam) systems, low pressure hot water ("LPHW") systems, process cooling water, chilled water, refrigeration (high pressure side) systems, or other fluid pumping systems). Data may be continuously sampled and used to adequately characterize a state (e.g., health state) of a system, establish acceptable energy usage thresholds, and/or create an energy usage profile for a particular type of thermal energy fluid transfer system, and for cognitive energy assessment. Data sampling may occur during a selected period of time (e.g., 24 hours of data sampling and training) and provide for the detection of anomalous system control and demand events of the measured system with no domain expertise involvement. The present invention also negates the need for ancillary data or hardware input requirements.

In one aspect, the present invention may deploy a single IoT sensor on a return section/return loop (post energy load section) of the piping network, and perform one or more cloud-based, real-time statistical detection operations on a single data point ($T_{return}$ which is the return temperature of the thermal energy fluid transfer system) and cognitively assess/determine energy usage efficiency. The present invention also negates the need for ancillary data or hardware input requirements. The one or more IoT sensors may be in a network of the IoT return sensors deployed across a complete campus cluster of thermal energy fluid transfer systems (e.g., a cluster of IoT sensors of the IoT network). In this way, the present invention provides for the generation and determination of a comprehensive measurement of the estate of the cluster of IoT sensors and/or provides Facilities Management and Operational personnel an automated method of validating boiler schedules across large campus estates that may be used to identify any anomalies against company agreed runtime policies.

Thus, as described herein, the present invention provides for assessing energy wastage in a thermal energy fluid transfer system, in a cloud computing environment, by a processor. In one aspect, data is continuously monitored and cognitively validated from at least one environmental control data object (or acquired through and easily deployable IoT sensor), in order to: 1) estimate system set point, 2) determine the number of system starts, 3) detect any daily schedules anomalies for ongoing enable/disable systems, 4) determine the commencement of no load events, 5) determine system run up time from system enablement flag, and/or 6) determine system unscheduled out of hours operation.

In one aspect, various embodiments may accept as inputs for cognitive energy assessment operations, system return temperature data and selected system control policies. One or more outputs of the cognitive energy assessments may include system set point estimates, system run up times, system daily no load starts, daily system enable and disable timestamps, system daily high load and no load event timestamps, and system out of normal operating hours. The cognitive energy assessment operations may be used for identifying capacity load balancing operations within the system and assessment opportunities to ascertain a correct sizing of boiler to meet ongoing demand within the targeted serviced building or area.

Additional aspects of the present invention and attendant benefits will be further described, following.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
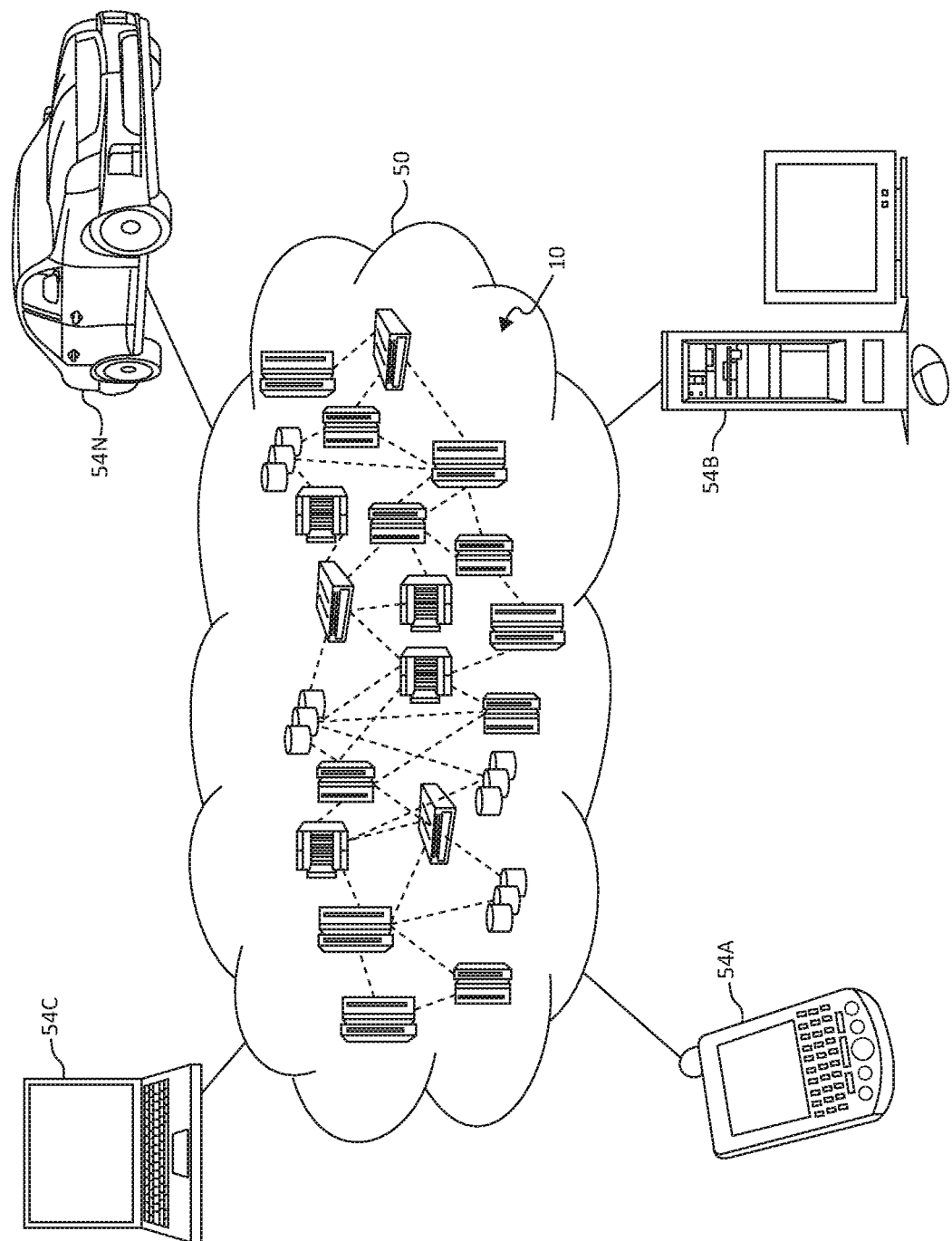
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
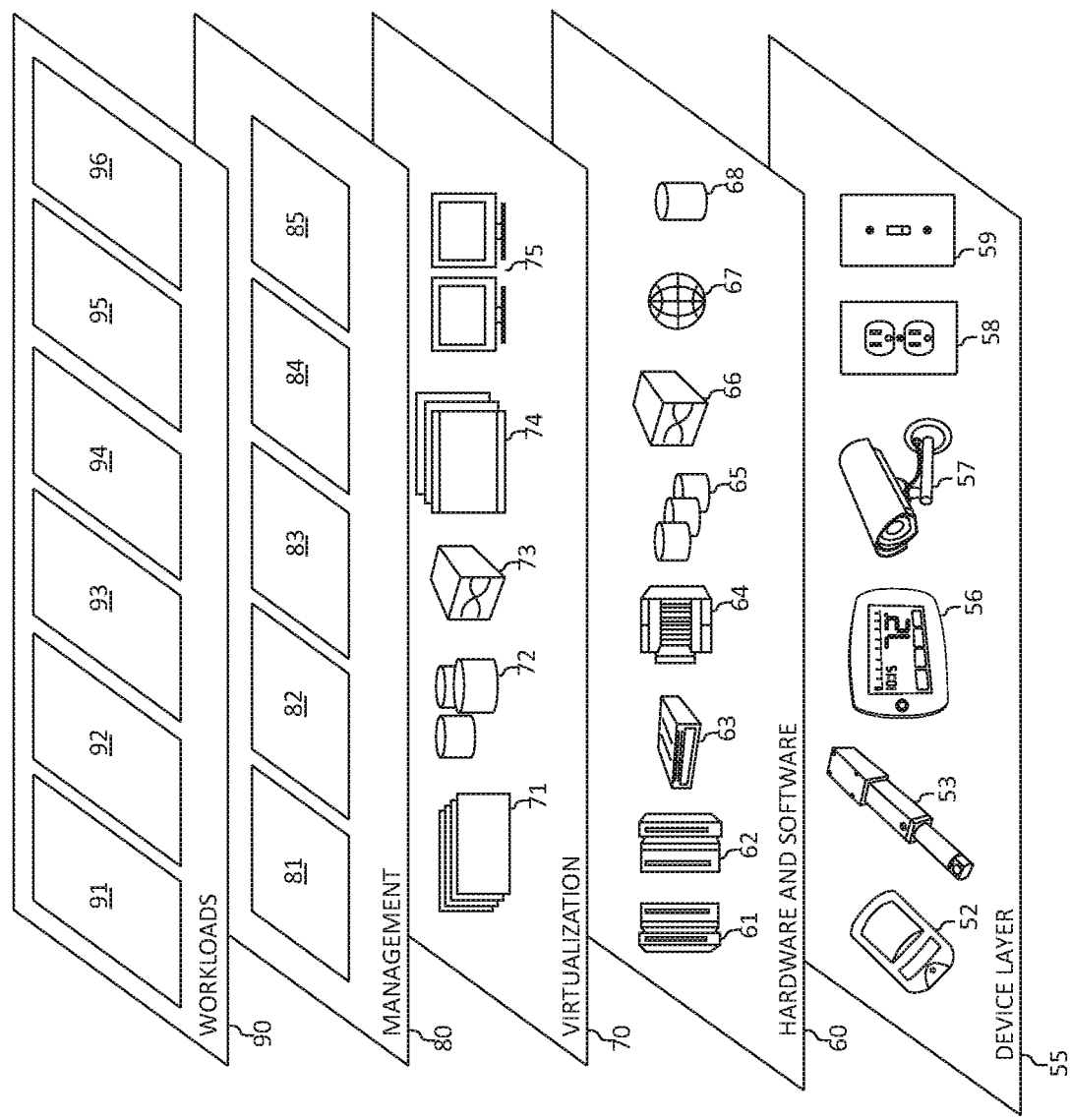
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitive energy assessments in a thermal energy fluid transfer system using an array of IoT sensors. In addition, workloads and functions 96 for cognitive energy assessments in a thermal energy fluid transfer system using an array of IoT sensors may include such operations as data analysis (including data collection and processing from various environmental sensors), and predictive data analytics functions. One of ordinary skill in the art will appreciate that the workloads and functions 96 for cognitive energy assessments in a thermal energy fluid transfer system using an array of IoT sensors may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides for cognitive energy assessments in a thermal energy fluid transfer system using an array of IoT sensors in a cloud computing environment. In one aspect, an IoT enabled temperature sensor may be coupled (e.g., strapped) to a section of pipe of the thermal energy fluid transfer system (e.g., a return loop of pipe network that is after the energy load) at a selected/known measured distance from a defined starting point, such as, for example, 100 meters distance from the defined starting point, which may be an outlet manifold of a circulating pump, or a valve injection point of a heat reservoir. Behavior of the thermal energy fluid transfer system, associated with a heating service, a cooling service, or a combination thereof, may be learned according to collected data to identify one or more energy usage events. An energy usage assessment operation may be performed using a temperature signal collected over a selected time period by one or more non-intrusive Internet of Things (IoT) sensors located at one or more selected positions in the thermal energy fluid transfer system to identify one or more energy usage waste events according to the learned behavior. A comparable temperature signal taken from an IoT sensor device of the proposed method of cognitive energy assessments, as described herein, may be validated against one or more energy usage threshold standards/values for the particular thermal energy fluid transfer system. Any temperature signal taken from an IoT sensor device that is above or outside a selected range of the one or more energy usage threshold standards/values may indicate energy waste usage. An alert (e.g., pass/fail) notification may be provided to a user (e.g., via a graphical user interface 'GUI' on a computing device such as a computer, tablet, smart phone, and the like).

Figure 4:
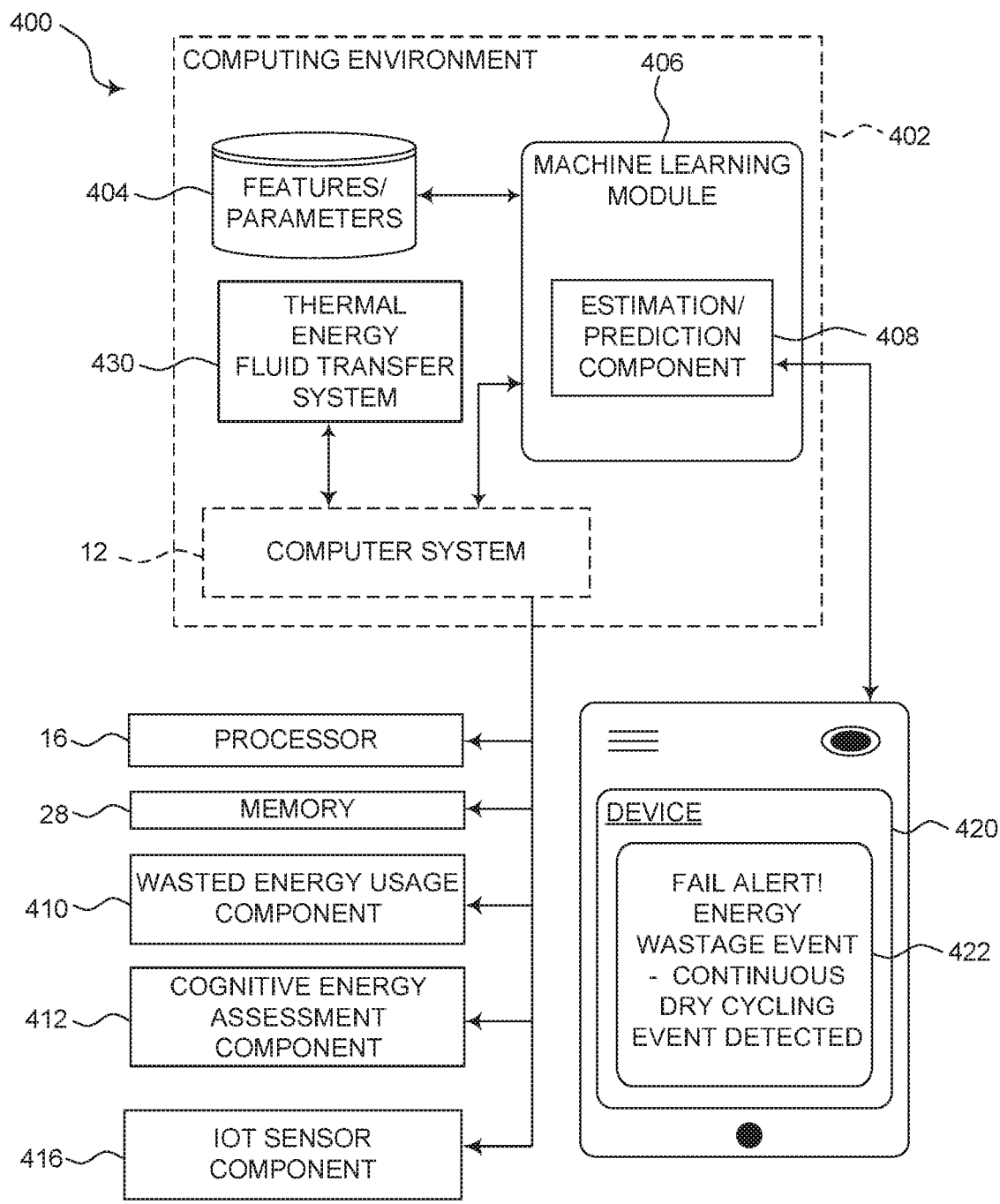
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments, is shown. FIG. 4 illustrates cognitive energy assessment and training of a machine-learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402 (e.g., included in a heat exchange system/unit), a thermal energy fluid transfer system 430, and a device 420, such as a desktop computer, laptop computer, tablet, smart phone, and/or another electronic device that may have one or more processors and memory. The device 420, the thermal energy fluid transfer system 430, and the computing environment 402 may each be associated with and/or in communication with each other, by one or more communication methods, such as a computing network. In one example, the device 420 and/or the thermal energy fluid transfer system 430 may be controlled by an owner, customer, or technician/administrator associated with the computing environment 402. In another example, the device 420 and/or the thermal energy fluid transfer system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 that is associated with a machine learning module 406 and the thermal energy fluid transfer system 430. The features and/or parameters database 404 may also include energy usage profiles for each thermal energy fluid transfer system 430 and/or IoT sensor devices associated with an IoT sensor component 416. It should be noted that one or more IoT sensor devices may be represented as the IoT sensor component 416 may be coupled to the thermal energy fluid transfer system 430. The features and/or parameters 404 may be a combination of features, parameters, behavior characteristics, energy usage profile data, energy usage threshold standards/values, temperature data, historical data, tested and validated data, or other specified/defined data for testing, monitoring, validating, detecting, learning, analyzing and/or calculating various conditions or diagnostics relating to cognitive energy assessment in the thermal energy fluid transfer system 430. That is, different combinations of parameters may be selected and applied to the input data for learning or training one or more machine learning models of the machine learning module 406. The features and/or parameters 404 may define one or more settings of one or more non-intrusive IoT sensors associated with the IoT sensor component 416 to enable the one or more non-intrusive IoT sensors to detect a temperature signal data via the IoT sensor component 416. The one or more non-intrusive IoT sensors associated with the IoT sensor component 416 may be coupled to the thermal energy fluid transfer system 430 at one or more defined distances from an alternative non-intrusive sensor.

The computing environment 402 may also include a computer system 12, as depicted in FIG. 1. The computer system 12 may also include the wasted energy usage component 410, a cognitive energy assessment component 412, and an IoT sensor component 416 each associated with the machine learning module for training and learning one or more machine learning models and also for applying multiple combinations of features, parameters, behavior characteristics, energy usage profiles, energy usage threshold standards/values, fluid flow rate data, temperature data, or a combination thereof to the machine learning model for cognitive energy assessment in a thermal energy fluid transfer system.

In one aspect, the machine learning module 406 may include an estimation/prediction component 408 for cognitively predicting and/or cognitively estimating energy assessment using temperature data from a temperature signal collected by one or more IoT sensors associated with the IoT sensor component 416 located at one or more selected positions of a piping network (e.g., a return line in a pipe loop) in the thermal energy fluid transfer system 430. For example, the computer system 12, using the wasted energy usage component 410 and the cognitive energy assessment component 412, may cognitively determine the energy usage by one or more IoT sensors associated with the IoT sensor component 416. An energy usage profile of the thermal energy fluid transfer system 430 may be created, defined, stored, and maintained in the machine learning module 406, the features and/or parameters 404, or both.

The machine learning module 406 may collect feedback information from the one or more IoT sensors associated with the IoT sensor component 416 to learn the behavior of the thermal energy fluid transfer system 430, establish energy usage schedules, energy usage threshold standards and values, establish an energy usage profile of the thermal energy fluid transfer system 430, establish a health state of the thermal energy fluid transfer system 430, detect (in association with the wasted energy usage component 410) one or more anomalous thermal energy fluid transfer system events, or a combination thereof. The machine learning module 406 may use the feedback information to provide a cognitive estimate of an energy output of the thermal energy fluid transfer system 430 using the estimation/prediction component 408. That is, the estimation/prediction component 408 may cognitively assess the energy of the thermal energy fluid transfer system 430 by one or more IoT sensors associated with the IoT sensor component 416. In short, the machine learning module 406 may be initialized using feedback information to learn behavior of a thermal energy fluid transfer system 430.

The wasted energy usage component 410 may cognitively detect an energy usage anomaly or wasted energy usage activities according to the collected temperature signal, which may be compared against energy usage thresholds and values.

The device 420 may include a graphical user interface (GUI) 422 enabled to display on the device 420 one or more user interface controls for a user to interact with the GUI 422. For example, the GUI 422 may display an energy output or fluid flow rate to a user via an interactive graphical user interface (GUI) according to the cognitive estimate of an energy output of the thermal energy fluid transfer system. For example, the energy output or fluid flow rate event may be an alert that indicates or displays audibly and/or visually on the GUI 422 "FAIL ALERT! ENERGY WASTAGE EVENT—CONTINUOUS DRY CYCLING EVENT DETECTED." It should be noted that "dry cycling" is caused by a boiler's standing losses. Dry cycling is the repeated firing of the thermal energy fluid transfer system—to maintain the internal water temperature of the thermal energy fluid transfer system—when there is actually no true heating demand (e.g., no energy) from the building or system the thermal energy fluid transfer system serves. The problem is exacerbated if water continues to be pumped around the heating circuits of the thermal energy fluid transfer system and the boilers then fire to compensate for thermal losses from the pipework system in order to maintain the desired fixed flow temperature. Dry cycling is at its worst during spring and autumn, when boilers tend to switch on and off or modulate—particularly when boilers are oversized.

In one aspect, the cognitive thermal energy assessment in a thermal energy fluid transfer system and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, a priori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

In one aspect, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
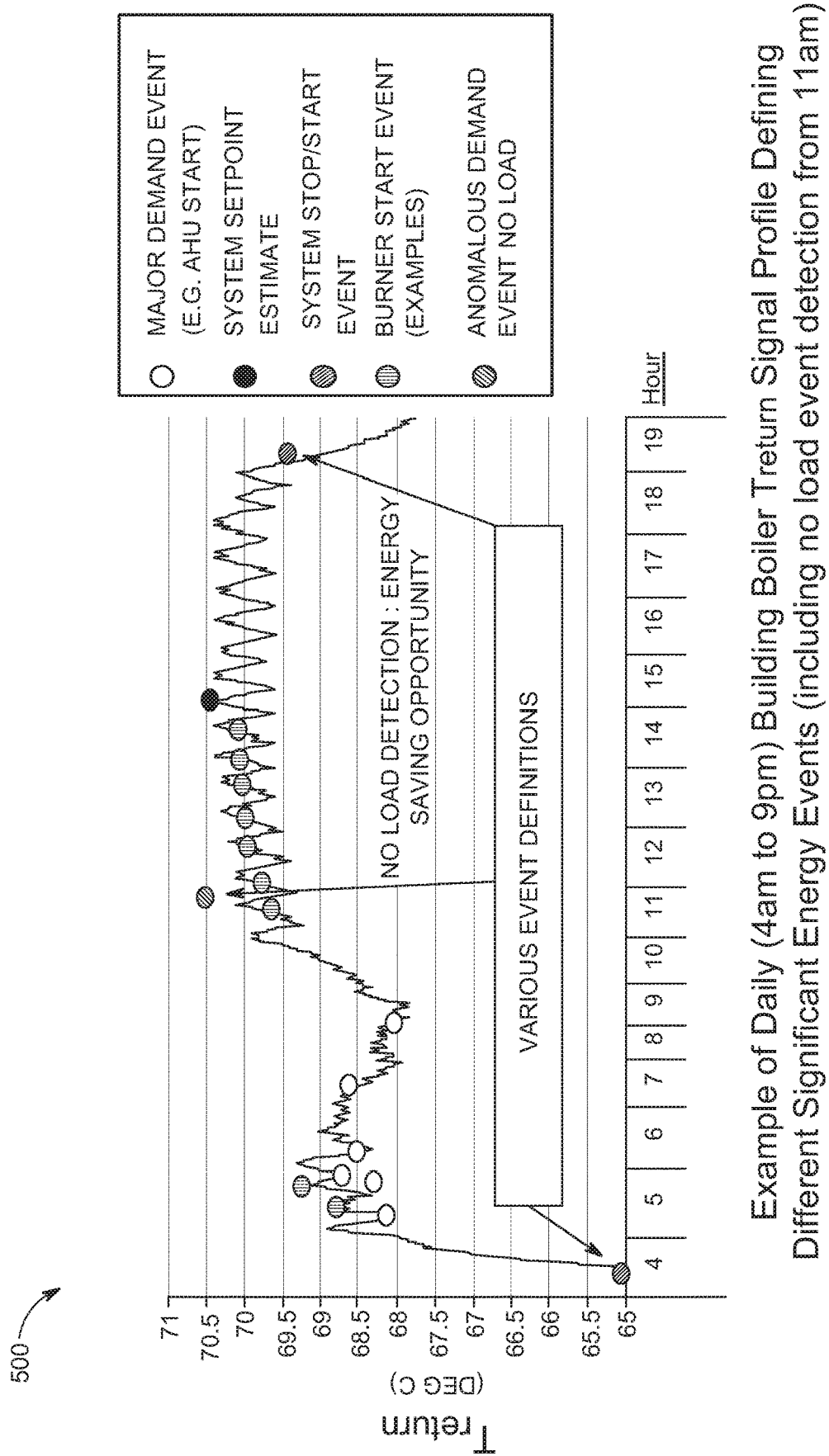
FIG. 5 is a graph diagram of an exemplary method for defining signal disambiguation event detection in a thermal energy fluid transfer system by a processor, in which various aspects of the present invention may be realized.

FIG. 5 is a graph diagram 500 of an exemplary method for defining signal disambiguation event detection (e.g., disambiguation operation) in a thermal energy fluid transfer system by a processor. That is, graph diagram 500 depicts an example of a typical daily sampling building boiler $T_{return}$ signal profile defining several different significant energy events (including no load event detection from 11 am i.e. building is exhibiting no heating demand as evidenced by the repeated dry cycling signal from 11 am) within a sample building with no load (no energy demand event) detection using a temperature signature collected from an IoT sensor device on a thermal energy fluid transfer system. Graph diagram 500 depicts an example of assessing energy in a thermal energy fluid transfer system in a cloud computing environment by a processor by plotting and defining one or more events relating to a thermal energy fluid transfer system that may occur within two events such as, for example, a system start time and a system stop time. Graph diagram 500 depicts the temperature (measured in degrees Celsius) on the Y-axis and the time period (e.g., hours and minutes) on the X-axis. A start time of a thermal energy fluid transfer system such as, for example, a boiler may be started at a first time period of about 4 hours and 21 minutes and the rise in the temperature to a major demand event (e.g., energy usage demand) detected at a second time period (e.g., 5 hours and 14 minutes). That is, the start time may be observed, by way of example only, at 4:00 a.m. and the stop time at 19:00 p.m. As observed in graph diagram 500, multiple energy usage demands ("major demand event") are depicted. Also, a set point, a burner start event(s), and a detection of an anomalous demand event (e.g., "no load" event) are also depicted by measuring a temperature signal collected from an IoT sensor device on a thermal energy fluid transfer system.

The graph 500 illustrates the present invention detecting both the start time and the stop time of a thermal energy fluid transfer system so as to enable the identification of any anomalies of the thermal energy fluid transfer system compared to an expected schedule (e.g., an expected daily schedule policy). Also, each energy required event (e.g., load event) and non-energy required event (no load event) during the schedule of operations (e.g., during a daily operation) may be detected. More specifically, the point in time (change point) of transitioning from a load event to a no load event (e.g., dry cycling of a boiler) may be detected. That is, the change point is where the thermal energy fluid transfer system goes into dry cycling; the point at which the only load on the system causing the boilers to fire and cause loop losses (e.g., the thermal energy being lost as it circulates in the system loop). Said differently, the change point may be a transition point from the energy required events to the non-energy required events. The change point, if consistent from day to day, may be detected as an energy wastage avoidance opportunity once detected (and acted upon using the thermal energy fluid transfer system for saving energy).

Also, by performing, in real time, cognitive energy assessment analysis may also generate one or more various types of alerts if anomalies are detected against defined rules (e.g., defined company policies, energy usage thresholds/values, or schedules of operations). The anomalies may also include deviations in expected system behavior and/or detecting significant shifts in no load change points within a time period (e.g., day) over time (which may be an indicator of seasonality change commencement), or system design over sizing in the event of continuous early change point (i.e., commencement of dry cycling event within the day) observation.

Figure 6:
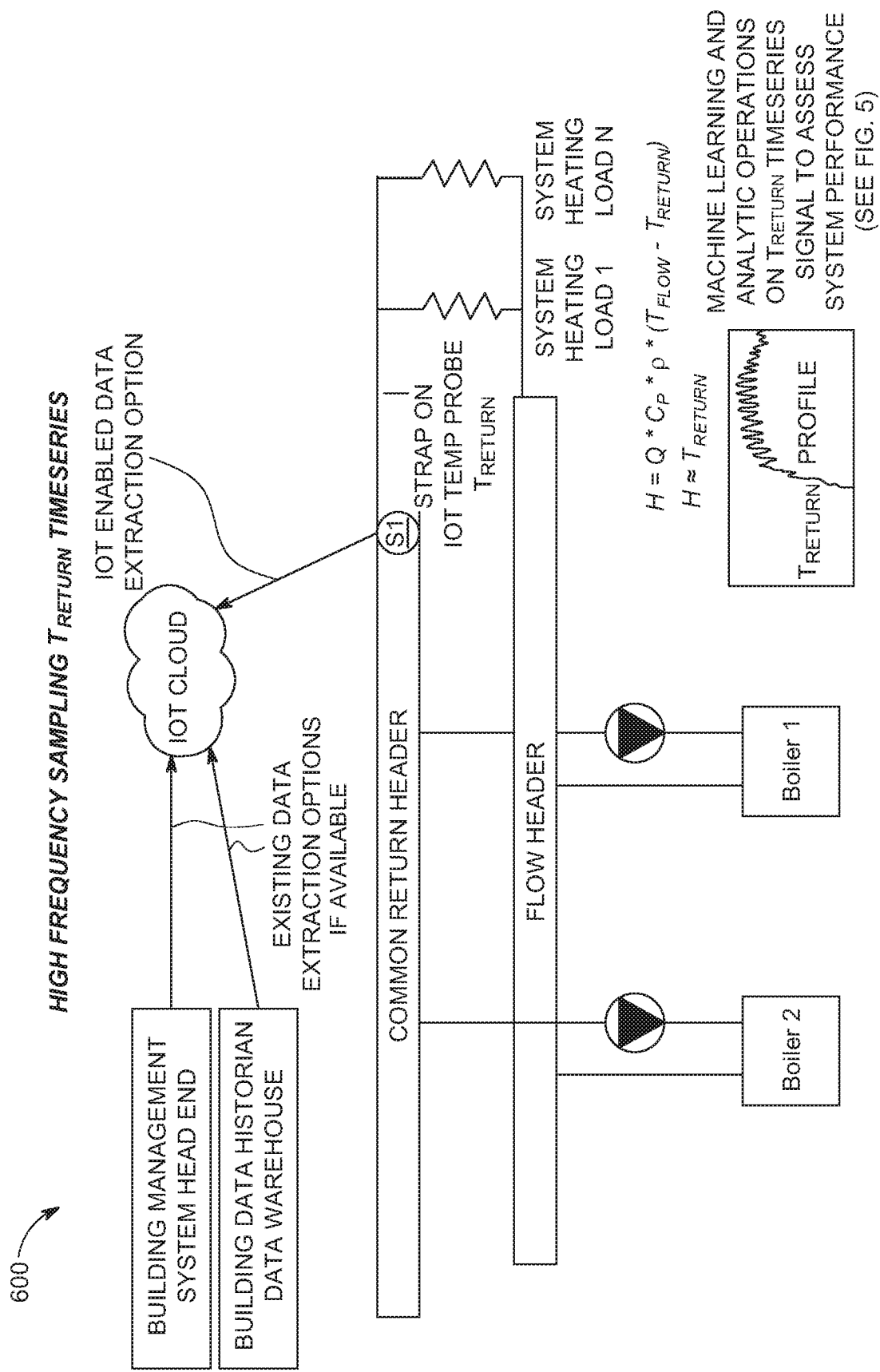
FIG. 6 is a block flow diagram of cognitive energy assessment in a thermal energy fluid transfer system in an Internet of Things (IoT) computing network in accordance with aspects of the present invention.

FIG. 6 is a diagram 600 depicting various user hardware and computing components functioning in a low pressure hot water (LPHW) system in accordance with aspects of the present invention. The LPHW system may include one or more boilers such as, for example, "boiler 1", one or more non-intrusive IoT sensors such as, for example, IoT sensor S1, a flow heater, a return heater, a pump, and a heating system load (e.g., load 1 and load n).

The IoT sensor S1 (e.g., IoT enabled temperature sensor S1) may be coupled (e.g., strapped) to a pipe such as, for example, an outside portion of selected pipe section (e.g., a return loop of a pipe network) of a target pipe to enable a cognitive estimation of performance (e.g., set point and system demand estimates). The various high frequency (e.g., a frequency above a selected or defined frequency such as, for example, sampling frequency of every one minute or less than every one minute) temperature readings from the IoT sensor S1 may be communicated to an IoT communication network (e.g., IoT cloud) so as to apply appropriate temperature signal detection operations running on a single data point ($T_{return}$) and to determine one or more key performance indicators ("KPI") such as, for example, system set point settings, a number of burner/boiler start events, or identification of system demand events, which may include no load demand events and/or short cycling demand events. That is, the various temperature readings from the IoT sensor S1 may be dynamically communicated to an IoT communication network (e.g., IoT cloud) so as to apply appropriate temperature signal detection operations running in an analytics layer of an IoT computing system. The accuracy of the sensing can be improved over time as additional detection events are created and detection operations are fine-tuned and/or learned using a machine learning mechanism. Also, using the assistance of a machine learning model, an anomaly detection operation may be applied to determine (e.g., in real-time/on demand) one or more anomalous events.

In an additional aspect, an IoT temperature enabled sensor S1 (e.g., IoT enabled temperature sensor S1) may be coupled (e.g., strapped) to a pipe such as, for example, an outside portion of selected pipe section of a fluid-return line/pipe back to a pump to enable sampling of data, $T_{return}$, with the system running a no load operation.

The present invention is based on the energy flow rate percentage of the thermal energy fluid transfer system according to equation 1:

$$H = Q \times C_p \times \rho \times (T_{flow} - T_{return}) \qquad (1),$$

where H is the heat flow rate (e.g., kilowatt Kw), $C_p$ is the specific heat capacity (e.g., measured in kilojoules per kilogram (KJ/KG degrees Celsius)), $\rho$ is the density (kg/m$^3$ where kg is kilogram and m is meter), and Q is the flow rate (m$^3$/s where s is seconds). The fluid flow rate ("q" or "Q") may be determined by an IoT temperature enabled sensor S1. Upon determining the fluid flow rate ("q" or "Q"), a load event may be detected that may impact the data, $T_{return}$. In one aspect, $T_{return}$ is the return temperature of a supplied hot water/chilled water as measured at a common return header. $T_{flow}$ may be the flow temperature of the supplied hot water/chilled water.

As the flow temperature ($T_{flow}$) and fluid flow rate (q) remain in a constant steady state during operation, the return temperature ($T_{return}$) may be used to make objective and comparative determination of system demand or load, as given by equation 2:

$$H \approx T_{return} \qquad (2).$$

It should be noted that for each individual fluid transfer pumping system, a high frequency sampling (sampling occurring less than 1 minute) of $T_{return}$ may be set up by identifying and accessing a data object within existing resource infrastructure such as, for example, a BMS or Historian warehouse, or by deployment of an independent IoT temperature sensor (e.g., IoT temperature enabled sensor S1), as a means of performing system energy assessment. The sampled data may be communicated and saved to a cloud computing environment and may continue to sample data for up to a selected time period (e.g., one month) in order to acquire sufficient training data. The training data may be used to generate tuning threshold levels for the thermal energy fluid transfer system, as described herein for learning behavior of the thermal energy fluid transfer system. Once a thermal energy fluid transfer system is tuned according to the trained data, a rule based data analytics operation may be applied on signal disambiguation detected events to report system anomalies during a selected time period (e.g., 24 hours).

Thus, a temperature sensor (IoT cloud enabled sensor) may be located a known distance away from the fluid transfer pump, which is continually sampling for the temperature signal. Once detected (at a level of statistical certainty or at a defined level), the temperature signal data may be determined and/or calculated. The sampled return temperature ($T_{return}$) data may be compared against an expected return temperature ($T_{return}$) data based on learned behavior (e.g., the training data), energy threshold standards/values, pipe dimensions, pipe material, fluid density, and ambient temperature, one or more IoT sensors, or a combination thereof for cognitive energy assessment. A pass/fail alert may be generated from the system based on the applied analytics operations. That is, a cognitive energy assessment report may be provided such as, for example, to an interactive graphical user interface ("GUI") of an internet-based computing system.

Turning now to FIG. 7, a graph diagram 700 of output results of comparing temperature signals for a selected time period during a supervised learning phase in a thermal energy fluid transfer system is depicted. As depicted, a comparative sample $T_{return}$ (see FIG. 6) sample time series (which is similar to the temperature signal of graph 500) may be sampled for one week from two different building LPHW systems. Given the variability between the two different LPHW systems, a supervised learning phase may be used to disseminate different demand and provisioning profiles which are system specific. The supervised learning phase may be used to generate the specific rates of change that can then be applied in real-time for ongoing anomaly detection within individual systems.

Figure 8:
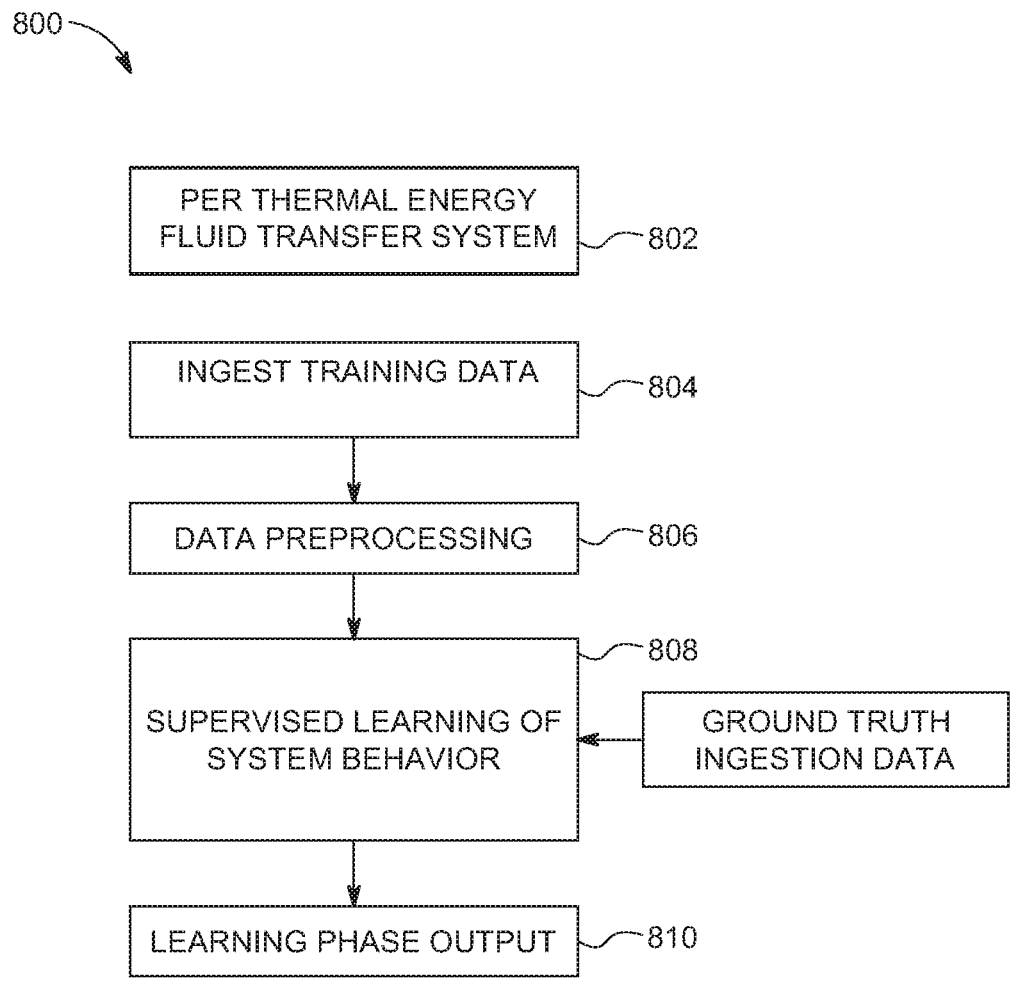
FIG. 8 is a block flow diagram of a supervised learning phase in a thermal energy fluid transfer system in an Internet of Things (IoT) computing network in accordance with aspects of the present invention.

Turning now to FIG. 8, a block flow diagram 800 of a supervised learning phase in a thermal energy fluid transfer system in an Internet of Things (IoT) computing network is depicted. The functionality 800 may be implemented as a method executed as instructions on a machine, where the instructions are included on at least one computer readable medium or one non-transitory machine-readable storage medium. The functionality 800 may start for a particular thermal energy fluid transfer system, as in in block 802. Training data may be sampled (e.g., ingest training data that may be raw data) using a temperature signal collected over a selected time period by one or more non-intrusive Internet of Things (IoT) sensors located at one or more selected positions in the thermal energy fluid transfer system, as in block 804. The sampling may be a high frequency sampling of $T_{return}$ over a selected period of time (e.g., at least four weeks). In one aspect, a common header LPHW return temperature ($T_{return}$) may be captured directly from a BMS or deployment of the one or more non-intrusive Internet of Things (IoT) sensors. The data of the collected sampling data may be preprocessed (e.g., data de-noising, normalization, slope calculations per time interval, and the like), as in block 806. Supervised learning of the thermal energy fluid transfer system's behavior may be learned, as in block 808. Temperature signal profile data may be ingested and tagged with actual event detection start timestamps. Cognitive energy assessment operations may be performed based on time intervals categorized into a number of first order derivative thresholds, rates of change, and deadband rates of change (a deadband may be a minimum percentage of a given range or amount by which a measured value must vary in order for a device or computer to register a change) so as to extract one or more system parameters. A learning phase output may be performed, as in block 810. The output may be dynamically communicated to a cloud environment, saved, and/or provided as a report to a GUI of a computer.

Figure 9:
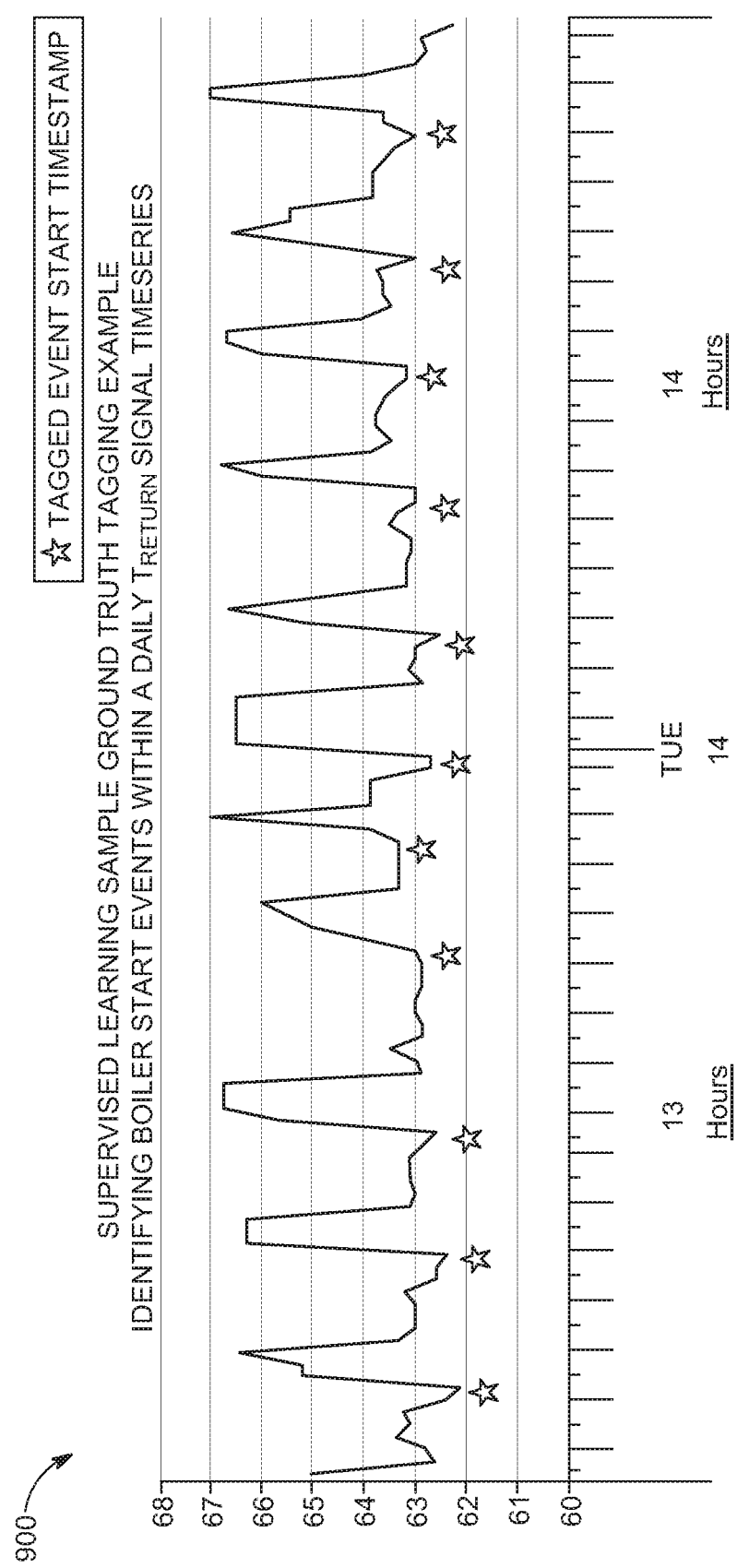
FIG. 9 is a graph diagram of a ground truth tagging in a thermal energy fluid transfer system in accordance with aspects of the present invention.

FIG. 9 is a graph diagram 900 of a sample ground truth tagging example for identifying boiler start events within a daily $T_{return}$ signal timeseries (non-domain expertise) in a thermal energy fluid transfer system. Similar to the graph diagram 500, a temperature signal is depicted with multiple tagged event start timestamps during a selected time period (e.g., hourly time period).

Figure 10:
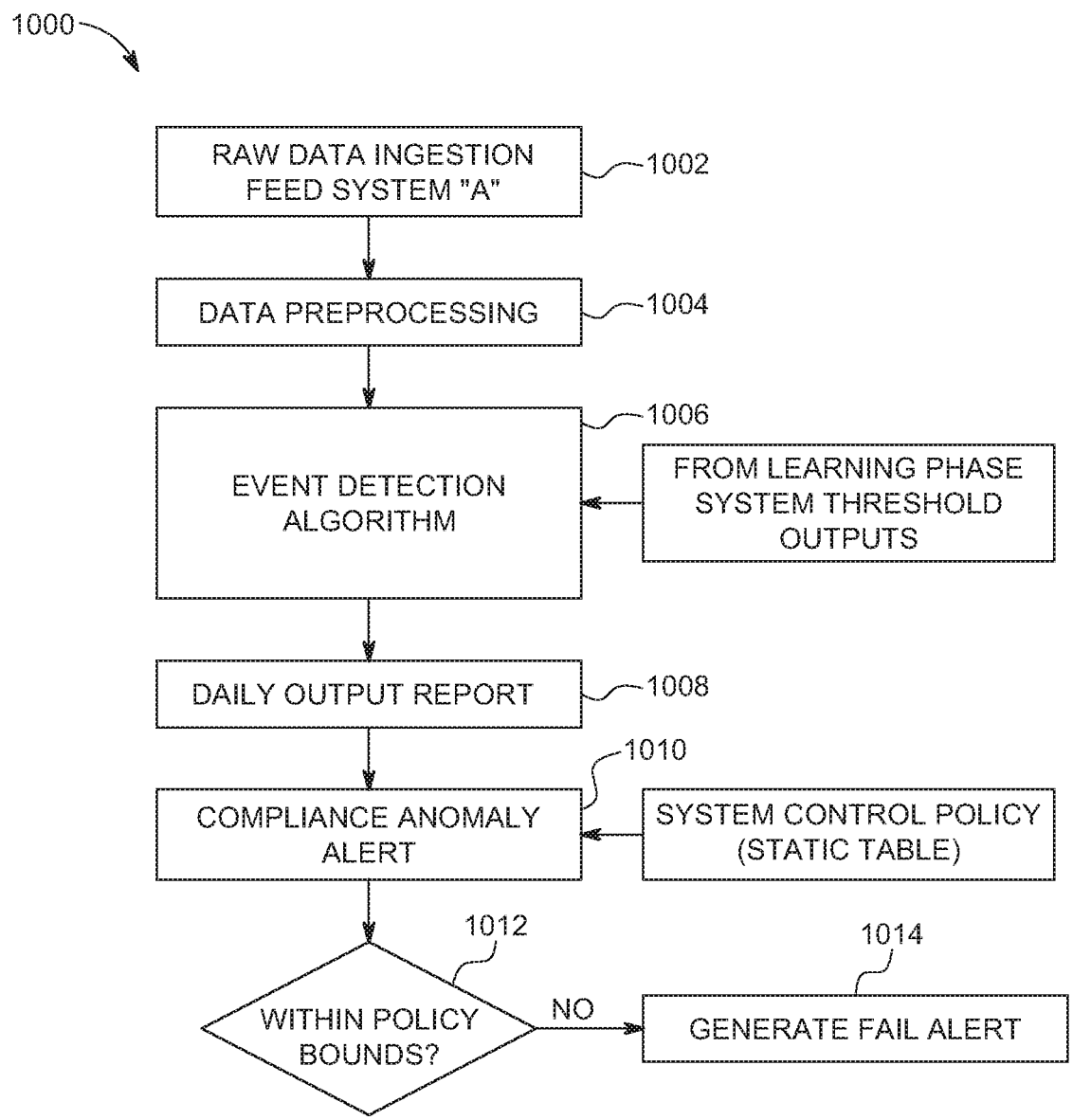
FIG. 10 is a block flow diagram of scheduled cognitive energy assessment of a thermal energy fluid transfer system in an Internet of Things (IoT) computing network in accordance with aspects of the present invention.

FIG. 10 is a block flow diagram of scheduled cognitive energy assessment of a thermal energy fluid transfer system in an Internet of Things (IoT) computing network. The functionality 1000 may be implemented as a method executed as instructions on a machine, where the instructions are included on at least one computer readable medium or one non-transitory machine-readable storage medium. The functionality 1000 may start by collecting or "ingesting" data for a selected thermal energy fluid transfer system (e.g., system "A"), as in block 1002. That is, data may be sampled using a temperature signal collected over a selected time period by one or more non-intrusive Internet of Things (IoT) sensors located at one or more selected positions in the thermal energy fluid transfer system. The sampling may be a high frequency sampling of $T_{return}$ over a selected period of time. In one aspect, a common header LPHW return temperature ($T_{return}$) may be captured directly from a BMS or deployment of the one or more non-intrusive Internet of Things (IoT) sensors. The data of the collected data may be preprocessed (e.g., data de-noising, normalization, slope calculations per time interval, and the like), as in block 1004. An event detection operation may be performed for identifying one or more types of events, as in block 1006. An output report (see FIG. 11) (e.g., "daily output report") of the cognitive event detection operation may be used (see also "learning phase output" of block 810 of FIG. 8), as in block 1008. For example, a currently sampled return temperature ($T_{return}$) may be compared to expected return temperature ($T_{return}$) values or thresholds learned or established during the learning phase. Any deviations or differences may be cognitively recognized as an anomaly or wasted energy usage operations. The output report (e.g., a daily output report) may be dynamically communicated to a cloud environment, saved, and/or provided as a report to a GUI of a computer. A compliance anomaly alert may be issued, as in block 1010. A system control policy may be used (e.g., a static table/master table with populated data that may include system profiles, behavior, policies, energy compliance requirements, energy usage thresholds, energy usage values, or energy usage standards, and the like) to assist with the compliance anomaly alert. A determination operation may be performed to determine whether or not the compliance anomaly alert is within the system control policies, as in block 1012. If the compliance anomaly alert is not within the system control policies, a fail alert (notification/warning) may be generated as in block 1014. For example, the fail alert may indicate that a boiler enabled time of Friday 2:55 a.m. is outside normal expected time/enablement limits.

FIG. 11 is a diagram depicting an output report 1100 of cognitive energy assessment of a thermal energy fluid transfer system in an Internet of Things (IoT) computing network. In one aspect, the output report may be generated as described in FIG. 10. The output report (e.g., a daily output report) may be dynamically communicated to a cloud environment, saved, and/or provided as a report to a GUI of a computer. The output report may include one or more selected columns, which may include for example, date, month, system enable times, system disable times, and system no load start times, and a variety of other user defined topics of choice. As depicted in output report 1100, the output report shows system enable times with daily reporting for a boiler's scheduling anomalies. For example, an alert flag ("flag*") is set for Friday $17^{th}$ indicating an anomaly of an early start based on a deviation from a system policy (e.g., the system enable time is outside an expected start time based on an expected system enable start time policy). As another example, output report 1100 shows an anomaly for system no load start. An alert flag is set for Friday $17^{th}$ which indicates an anomaly of an early no load detection based on a deviation from a system policy (e.g., the no load detection is outside an expected normal time of the year).

Figure 12:
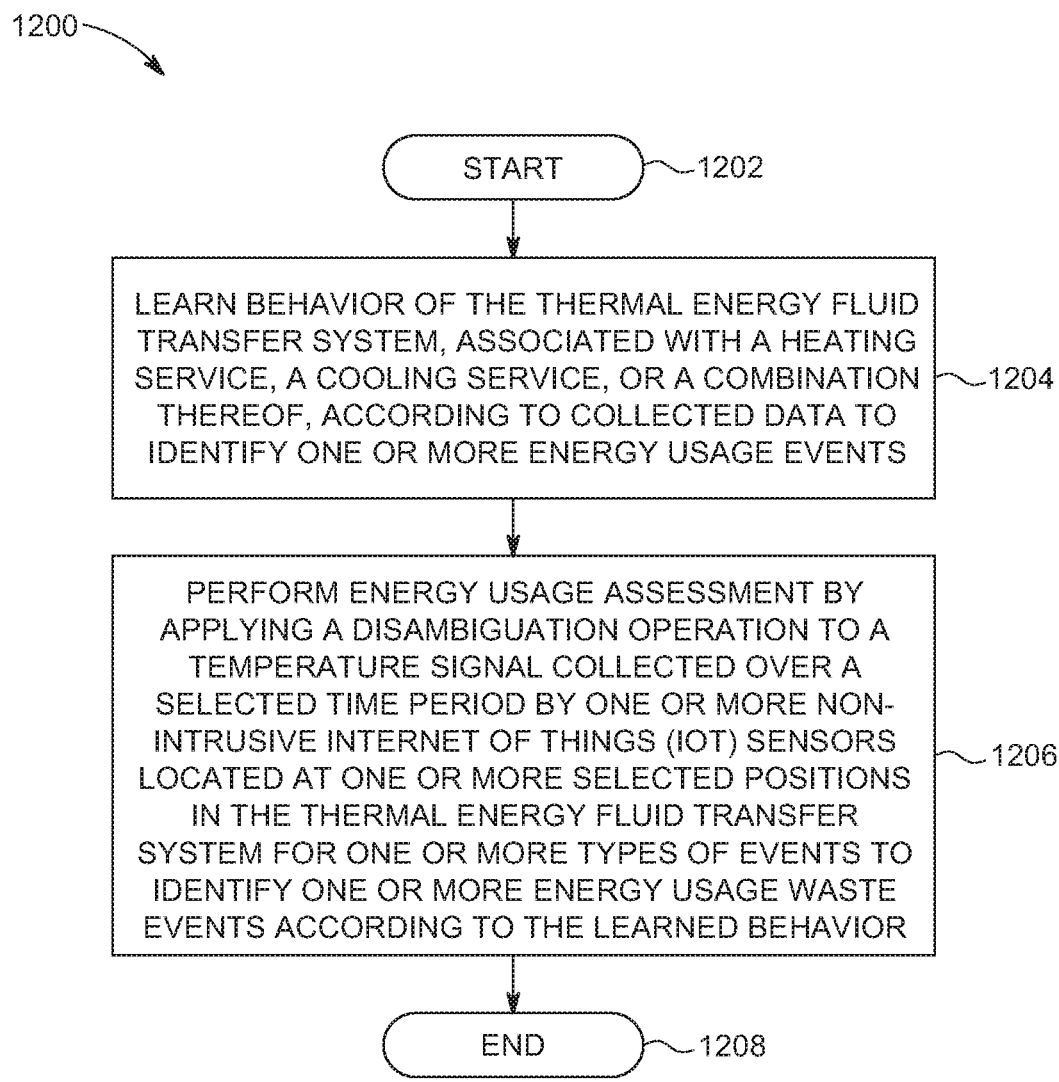
FIG. 12 is a flowchart diagram of an exemplary method for cognitive energy assessment in a thermal energy fluid transfer system in a cloud computing environment by a processor, in which various aspects of the present invention may be realized.

FIG. 12 is a method 1200 for cognitive energy assessment in a thermal energy fluid transfer system by a processor, in which various aspects of the illustrated embodiments may be implemented. The functionality 1200 may be implemented as a method executed as instructions on a machine, where the instructions are included on at least one computer readable medium or one non-transitory machine-readable storage medium. The functionality 1200 may start in block 1202. Behavior of the thermal energy fluid transfer system, associated with a heating service, a cooling service, or a combination thereof, may be learned according to collected data to identify one or more energy usage events, as in block 1204. An energy usage assessment operation may be performed by using and/or applying a disambiguation operation (e.g., disambiguation event detection operation) to a temperature signal collected over a selected time period by one or more non-intrusive Internet of Things (IoT) sensors located at one or more selected positions in the thermal energy fluid transfer system to identify one or more energy usage waste events according to the learned behavior, as in block 1206. The disambiguation operation may include dissecting the temperature signal into the one or more type of events; and analyzing the temperature signal to obtain a signature for the one or more type of events. The signatures for each type of event may be learned and used. The functionality 1200 may end in block 1208.

In one aspect, in conjunction with and/or as part of at least one block of FIG. 12, the operations of method 1200 may include each of the following. The operations of method 1200 may include initializing a machine learning mechanism using the feedback information from the one or more non-intrusive IoT sensors to provide an energy usage profile of the thermal energy fluid transfer system, generating one or more energy usage tuning thresholds according to the collected data, continuously sampling temperature data over the selected time period by the one or more non-intrusive IoT sensors, or performing a combination thereof. The machine learning mechanism may be implemented using the feedback information to provide a cognitive estimate of an energy output of the thermal energy fluid transfer system.

The operations of method 1200 may include comparing the temperature signal of one or more current energy usage events to one or more energy usage tuning thresholds to identify the one or more energy usage waste events.

The operations of method 1200 may include determining a thermal energy fluid transfer system start time and a thermal energy fluid transfer system stop time for a schedule of operations to identify the one or more energy usage waste events, estimating energy required events (e.g., an energy load on the thermal energy fluid transfer system) and non-energy required events (e.g., no energy load on the thermal energy fluid transfer system) during the schedule of operations, determining an unexpected change point during the schedule of operations, wherein a change point is a transition from the energy required events to the non-energy required events, or performing a combination thereof. An alert (e.g., a pass/fail alert) may be generated to indicate identification of the one or more energy usage waste events. Also, the results of the energy usage assessment may be provided to a user via an interactive graphical user interface (GUI) for the thermal energy fluid transfer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for assessing energy in a thermal energy fluid transfer system in a cloud computing environment by a processor, comprising:
    deploying a high frequency sampling operation in the thermal energy fluid transfer system associated with a heating service, a cooling service, or a combination thereof by identifying and accessing a data object within a data historian warehouse of existing resource infrastructure associated with the thermal energy fluid transfer system, and initiating the high frequency sampling operation using the data object, wherein the high frequency sampling operation samples data at a predetermined frequency for a predetermined time period, the predetermined time period comprising a time period during which a threshold amount of data is collected to use as training data as input to a machine learning operation modeling the thermal energy fluid transfer system, and wherein the data collected by the high frequency sampling operation is obtained by identifying a temperature of fluid transferred through the thermal energy fluid transfer system at the predetermined frequency;
    executing machine learning logic performing the machine learning operation to use the training data to learn behavior of the thermal energy fluid transfer and generate tuning threshold levels for the modeling of the thermal energy fluid transfer system according to the learned behavior; and
    performing energy usage assessment by applying a disambiguation operation to a single temperature signal, representing the temperature of the fluid and collected over a second predetermined time period by only a single non-intrusive Internet of Things (IoT) sensor coupled externally to a return piping section at a selected position in the thermal energy fluid transfer system, for one or more types of events to identify one or more energy usage waste events according to the learned behavior, wherein the disambiguation operation includes performing real-time statistical detection operations to identify a system-wide usage pattern of the thermal energy fluid transfer system using collected time-series data from only a single data point by the single non-intrusive IoT sensor, wherein the selected position includes coupling the single non-intrusive IoT sensor externally to the return piping at a selectively measured distance from a defined reference point of the thermal energy fluid transfer system, and wherein the single non-intrusive IoT sensor is externally coupled to the return piping comprising a loop of pipe network located subsequent to an energy load serviced by the thermal energy fluid transfer system to continuously sample temperature data to detect load and no load actions of the one or more energy usage waste events.

2. The method of claim 1, wherein the disambiguation operation further includes:
    dissecting the temperature signal into the one or more types of events; and
    analyzing the temperature signal to obtain a signature for the one or more type of events.

3. The method of claim 1, further including generating one or more energy usage tuning thresholds according to the collected data.

4. The method of claim 1, further including comparing the temperature signal of one or more current energy usage events to tuning threshold levels to identify the one or more energy usage waste events.

5. The method of claim 1, wherein the machine learning operation uses feedback information of the data collected from the single non-intrusive IoT sensor to provide an energy usage profile of the thermal energy fluid transfer system.

6. The method of claim 1, further including:
determining a thermal energy fluid transfer system start time and a thermal energy fluid transfer system stop time for a schedule of operations to identify the one or more energy usage waste events;
estimating energy required events and non-energy required events during the schedule of operations; and
determining an unexpected change point during the schedule of operations, wherein a change point is a transition from the energy required events to the non-energy required events.

7. The method of claim 1, further including:
providing an alert to indicate identification of the one or more energy usage waste events;
providing the energy usage assessment to a user via an interactive graphical user interface (GUI) for the thermal energy fluid transfer system.

8. A system for assessing energy in a thermal energy fluid transfer system in a cloud computing environment, comprising:
one or more computers with executable instructions that when executed cause the system to:
deploy a high frequency sampling operation in the thermal energy fluid transfer system associated with a heating service, a cooling service, or a combination thereof by identifying and accessing a data object within a data historian warehouse of existing resource infrastructure associated with the thermal energy fluid transfer system, and initiating the high frequency sampling operation using the data object, wherein the high frequency sampling operation samples data at a predetermined frequency for a predetermined time period, the predetermined time period comprising a time period during which a threshold amount of data is collected to use as training data as input to a machine learning operation modeling the thermal energy fluid transfer system, and wherein the data collected by the high frequency sampling operation is obtained by identifying a temperature of fluid transferred through the thermal energy fluid transfer system at the predetermined frequency;
execute machine learning logic performing the machine learning operation to use the training data to learn behavior of the thermal energy fluid transfer and generate tuning threshold levels for the modeling of the thermal energy fluid transfer system according to the learned behavior; and
perform energy usage assessment by applying a disambiguation operation to a single temperature signal, representing the temperature of the fluid and collected over a second predetermined time period by only a single non-intrusive Internet of Things (IoT) sensor coupled externally to a return piping section at a selected position in the thermal energy fluid transfer system, for one or more types of events to identify one or more energy usage waste events according to the learned behavior, wherein the disambiguation operation includes performing real-time statistical detection operations to identify a system-wide usage pattern of the thermal energy fluid transfer system using collected time-series data from only a single data point by the single non-intrusive IoT sensor, wherein the selected position includes coupling the single non-intrusive IoT sensor externally to the return piping at a selectively measured distance from a defined reference point of the thermal energy fluid transfer system, and wherein the single non-intrusive IoT sensor is externally coupled to the return piping comprising a loop of pipe network located subsequent to an energy load serviced by the thermal energy fluid transfer system to continuously sample temperature data to detect load and no load actions of the one or more energy usage waste events.

9. The system of claim 8, wherein the executable instructions further:
use feedback information of the collected data from the single non-intrusive IoT sensor to provide an energy usage profile of the thermal energy fluid transfer system by the machine learning operation; and
generate one or more energy usage tuning thresholds according to the collected data and feedback information.

10. The system of claim 8, wherein the disambiguation operation further includes executable instructions that:
dissect the temperature signal into the one or more types of events; and
analyze the temperature signal to obtain a signature for the one or more type of events.

11. The system of claim 8, wherein the executable instructions further compare the temperature signal of one or more current energy usage events to the tuning threshold levels to identify the one or more energy usage waste events.

12. The system of claim 8, wherein the executable instructions further:
determine a thermal energy fluid transfer system start time and a thermal energy fluid transfer system stop time for a schedule of operations to identify the one or more energy usage waste events;
estimate energy required events and non-energy required events during the schedule of operations; and
determine an unexpected change point during the schedule of operations, wherein a change point is a transition from the energy required events to the non-energy required events.

13. The system of claim 8, wherein the executable instructions further:
provide an alert to indicate identification of the one or more energy usage waste events; and
provide the energy usage assessment to a user via an interactive graphical user interface (GUI) for the thermal energy fluid transfer system.

14. A computer program product for assessing energy in a thermal energy fluid transfer system in a cloud computing environment by a processor, the computer program product comprising a non-transitory computer-readable storage medium having computer-readable program code portions stored therein, the computer-readable program code portions comprising:
an executable portion that deploys a high frequency sampling operation in the thermal energy fluid transfer system associated with a heating service, a cooling service, or a combination thereof by identifying and accessing a data object within a data historian warehouse of existing resource infrastructure associated with the thermal energy fluid transfer system, and initiating the high frequency sampling operation using the data object, wherein the high frequency sampling operation samples data at a predetermined frequency for a predetermined time period, the predetermined time period comprising a time period during which a threshold amount of data is collected to use as training data as input to a machine learning operation modeling the thermal energy fluid transfer system, and wherein the data collected by the high frequency sampling operation is obtained by identifying a temperature of fluid transferred through the thermal energy fluid transfer system at the predetermined frequency;

an executable portion that executes machine learning logic performing the machine learning operation to use the training data to learn behavior of the thermal energy fluid transfer and generate tuning threshold levels for the modeling of the thermal energy fluid transfer system according to the learned behavior;

an executable portion that performs energy usage assessment by applying a disambiguation operation to a single temperature signal, representing the temperature of the fluid and collected over a second predetermined time period by only a single non-intrusive Internet of Things (IoT) sensor coupled externally to a return piping section at a selected position in the thermal energy fluid transfer system, for one or more types of events to identify one or more energy usage waste events according to the learned behavior, wherein the disambiguation operation includes performing real-time statistical detection operations to identify a system-wide usage pattern of the thermal energy fluid transfer system using collected time-series data from only a single data point by the single non-intrusive IoT sensor, wherein the selected position includes coupling the single non-intrusive IoT sensor externally to the return piping at a selectively measured distance from a defined reference point of the thermal energy fluid transfer system, and wherein the single non-intrusive IoT sensor is externally coupled to the return piping comprising a loop of pipe network located subsequent to an energy load serviced by the thermal energy fluid transfer system to continuously sample temperature data to detect load and no load actions of the one or more energy usage waste events.

15. The computer program product of claim 14, further including an executable portion that:
uses feedback information of the collected data from the single non-intrusive IoT sensor to provide an energy usage profile of the thermal energy fluid transfer system by the machine learning operation; and
generates one or more energy usage tuning thresholds according to the collected data and feedback information.

16. The computer program product of claim 14, wherein the disambiguation operation further includes an executable portion that:
dissects the temperature signal into the one or more types of events; and
analyzes the temperature signal to obtain a signature for the one or more type of events.

17. The computer program product of claim 14, further including an executable portion that compares the temperature signal of one or more current energy usage events to the tuning threshold levels to identify the one or more energy usage waste events.

18. The computer program product of claim 14, further including an executable portion that:
determines a thermal energy fluid transfer system start time and a thermal energy fluid transfer system stop time for a schedule of operations to identify the one or more energy usage waste events;
estimates energy required events and non-energy required events during the schedule of operations; and
determines an unexpected change point during the schedule of operations, wherein a change point is a transition from the energy required events to the non-energy required events.

19. The computer program product of claim 14, further including an executable portion that provides an alert to indicate identification of the one or more energy usage waste events.

20. The computer program product of claim 14, further including an executable portion that provides the energy usage assessment to a user via an interactive graphical user interface (GUI) for the thermal energy fluid transfer system.

* * * * *